US008711454B2

(12) United States Patent
Ito

(10) Patent No.: US 8,711,454 B2
(45) Date of Patent: Apr. 29, 2014

(54) IMAGE SCANNER AND IMAGE FORMING APPARATUS

(75) Inventor: Masao Ito, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 346 days.

(21) Appl. No.: 13/035,270

(22) Filed: Feb. 25, 2011

(65) Prior Publication Data

US 2012/0057208 A1 Mar. 8, 2012

(30) Foreign Application Priority Data

Sep. 8, 2010 (JP) ................................. 2010-200732

(51) Int. Cl.
G03F 3/08 (2006.01)
H04N 1/46 (2006.01)
H04N 1/028 (2006.01)
H04N 1/60 (2006.01)

(52) U.S. Cl.
CPC ........... *H04N 1/028* (2013.01); *H04N 1/02885* (2013.01); *H04N 2201/0312* (2013.01); *H04N 2201/03137* (2013.01); *H04N 1/6086* (2013.01); *H04N 1/6005* (2013.01)
USPC ........ 358/521; 358/1.12; 358/1.14; 358/3.26; 358/504; 358/505; 358/509; 358/518; 358/520; 358/498

(58) Field of Classification Search
CPC .............. H04N 2201/0312; H04N 2201/0317; H04N 1/0285; H04N 1/02855; H04N 1/0286; H04N 1/02885; H04N 1/0289; H04N 1/02895; H04N 1/38; H04N 1/60; H04N 1/6005; H04N 1/6075; H04N 1/6077; H04N 1/6086; G01N 21/57; G01N 2021/8663; G01N 21/552; G01N 21/86; G01J 3/505; G06K 9/4661
USPC ................. 358/1.9, 3.26–3.27, 504, 518–520
See application file for complete search history.

(56) References Cited

U.S. PATENT DOCUMENTS

| 4,685,071 | A | * | 8/1987 | Lee ............................... 382/162 |
| 5,748,221 | A | * | 5/1998 | Castelli et al. ................ 347/232 |
| 6,061,091 | A | * | 5/2000 | Van de Poel et al. ......... 348/241 |
| 7,312,896 | B2 | * | 12/2007 | Shibahara et al. ............. 358/1.9 |
| 7,397,565 | B2 | * | 7/2008 | Nakaya et al. ................ 356/446 |
| 7,423,758 | B1 | * | 9/2008 | Typpo ........................... 356/445 |
| 7,531,789 | B2 | * | 5/2009 | Nakaya et al. ................ 250/226 |
| 7,920,300 | B2 | * | 4/2011 | Nakaya et al. ................ 358/474 |
| 2001/0033382 | A1 | * | 10/2001 | Preston et al. ................ 356/445 |
| 2006/0092412 | A1 | * | 5/2006 | Doshoda et al. ........... 356/243.1 |
| 2008/0094631 | A1 | * | 4/2008 | Jung et al. .................... 356/419 |
| 2010/0027079 | A1 | | 2/2010 | Nishina et al. |
| 2011/0151410 | A1 | * | 6/2011 | Jung et al. .................... 433/215 |

FOREIGN PATENT DOCUMENTS

| JP | A-6-294999 | 10/1994 |
| JP | A-2001-313794 | 11/2001 |
| JP | A-2006-14081 | 1/2006 |
| JP | A-2010-35056 | 2/2010 |

* cited by examiner

*Primary Examiner* — Richard Zhu
(74) *Attorney, Agent, or Firm* — Oliff PLC

(57) ABSTRACT

An image scanner includes: a light source that irradiates, with light, a recording medium on which an image is formed; a light receiving portion that receives light reflected by the recording medium; and a reflecting portion that has a reflecting surface for measuring the amount of specular reflection light coming from the light source, the specular reflection light being included in the light received by the light receiving portion.

20 Claims, 9 Drawing Sheets

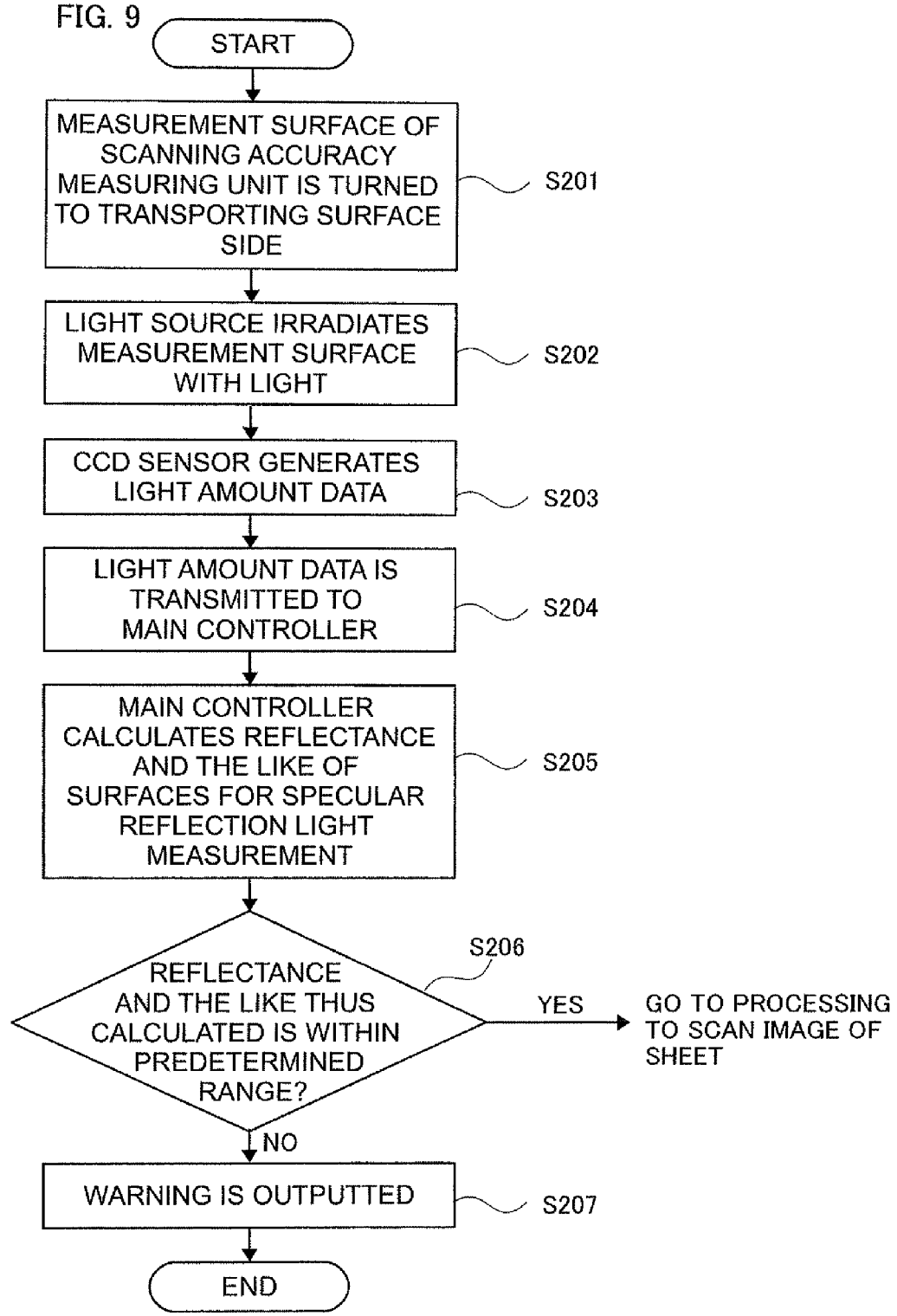

IMAGE SCANNER AND IMAGE FORMING APPARATUS

CROSS REFERENCE TO RELATED APPLICATIONS

This application is based on and claims priority under 35 USC §119 from Japanese Patent Application No. 2010-200732 filed Sep. 8, 2010.

BACKGROUND

1. Technical Field

The present invention relates to an image scanner and an image forming apparatus.

2. Related Art

An image scanner scanning image information of a sheet on which an image is formed has conventionally been used as a scanner or the like for input to a copy machine, a facsimile or a computer. Such an image scanner causes a light source disposed at a transport path of a sheet to irradiate the sheet with light, causes an image sensor to receive reflected light reflected from the sheet, and thereby scans an image on the sheet.

SUMMARY

According to an aspect of the present invention, there is provided an image scanner including: a light source that irradiates, with light, a recording medium on which an image is formed; a light receiving portion that receives light reflected by the recording medium; and a reflecting portion that has a reflecting surface for measuring the amount of specular reflection light coming from the light source, the specular reflection light being included in the light received by the light receiving portion.

BRIEF DESCRIPTION OF THE DRAWINGS

An exemplary embodiment of the present invention will be described in detail based on the following figures, wherein:

FIG. 9 is a flowchart illustrating a procedure to measure the amount of the specular reflection light from the light source.

DETAILED DESCRIPTION

An exemplary embodiment of the present invention will be described in detail with reference to the attached drawings.
<Description of Image Forming Apparatus>

Figure 1:
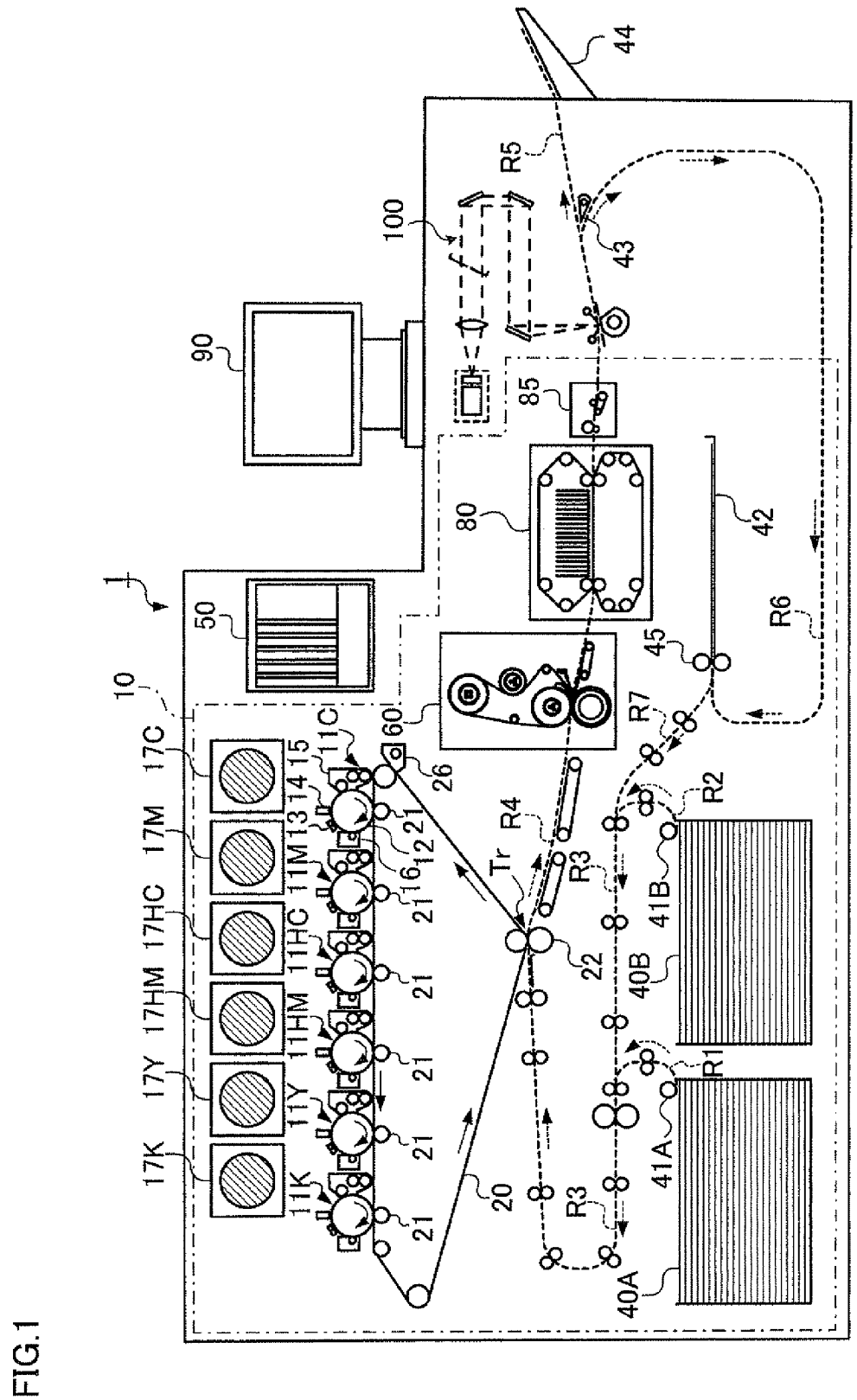
FIG. 1 is a diagram illustrating an image forming apparatus to which an image scanner according to an exemplary embodiment is applied.

FIG. 1 is a diagram illustrating an image forming apparatus 1 to which an image scanner 100 according to the present exemplary embodiment is applied.

The image forming apparatus 1 is a so-called "tandem-type" color printer, and includes: an image forming portion 10 that forms an image on a sheet serving as an example of a recording medium, on the basis of image data; a main controller 50 that controls operations of the entire image forming apparatus 1, performs communications with a personal computer (PC) or the like, for example, and performs image processing and the like on image data; a user interface (UI) portion 90 that receives an input operation made by a user and displays various information for a user; and the image scanner 100 as an example of a scanner unit that scans an image on a sheet in order to adjust an image to be formed on the sheet by the image forming portion 10.

<Description of Image Forming Portion>

The image forming portion 10 is a functional portion that forms an image by an electrophotographic system, for example, and includes: six image forming units 11C, 11M, 11HC, 11HM, 11Y and 11K (hereinafter, referred to as "image forming units 11" collectively) as an example of a toner image forming unit that are arranged in parallel; an intermediate transfer belt 20 onto which color toner images respectively formed on photoconductive drums 12 of the respective image forming units 11 are transferred; and primary transfer rolls 21 that transfer (primarily transfer), onto the intermediate transfer belt 20, the color toner images formed by the respective image forming units 11. The image forming portion 10 further includes: a secondary transfer roll 22 that collectively transfers (secondarily transfers), onto a sheet, the color toner images transferred on the intermediate transfer belt 20 in a superimposing manner; and a fixing unit 60 as an example of a fixing unit (a fixing device) that fixes the secondarily transferred color toner images on the sheet. Hereinafter, a region in which the secondary transfer roll 22 is disposed to secondarily transfer, onto the sheet, the color toner images on the intermediate transfer belt 20 will be referred to as "secondary transfer region Tr."

Additionally, the image forming portion 10 includes: a cooling unit 80 as an example of a cooling portion that cools the color toner images fixed on the sheet by the fixing unit 60 so as to facilitate fixation of the color toner images on the sheet; and a curl correcting unit 85 that corrects curl of the sheet. In the image forming apparatus 1 of the present exemplary embodiment, the intermediate transfer belt 20, the primary transfer rolls 21 and the secondary transfer roll 22 constitute a transfer unit that transfers a toner image onto a sheet.

<Description of Image Forming Unit>

As functional members, each of the image forming units 11 includes, for example: the photoconductive drum 12 on which an electrostatic latent image is formed and thereafter each color toner image is formed; a charging device 13 that charges the surface of the photoconductive drum 12 at a predetermined electric potential; an exposure device 14 that exposes, on the basis of image data, the photoconductive drum 12 charged by the charging device 13; a developing device 15 that develops the electrostatic latent image formed on the photoconductive drum 12 by using a toner of each color; and a cleaner 16 that cleans the surface of the photoconductive drum 12 after transfer.

The developing devices 15 of the respective image forming units 11 are respectively connected through toner transport paths (not shown) to toner containers 17C, 17M, 17HC, 17HM, 17Y and 17K (hereinafter, referred to as "toner containers 17" collectively) that store the respective color toners.

The developing devices 15 are configured to be refilled with the respective color toners from the toner containers 17 through refill screws (not shown) provided in the toner transport paths.

The image forming units 11 have substantially similar configurations except for toners housed in the respective developing devices 15, and form toner images of the respective colors of cyan (C), magenta (M), highlight cyan (HC), highlight magenta (HM), yellow (Y) and black (K). Here, HC has a hue of cyan, and has a lighter color tone and relatively lighter saturation than C. HM has a hue of magenta, and has a lighter color tone and relatively lighter saturation than M.

<Description of Fixing Unit>

Figure 2:
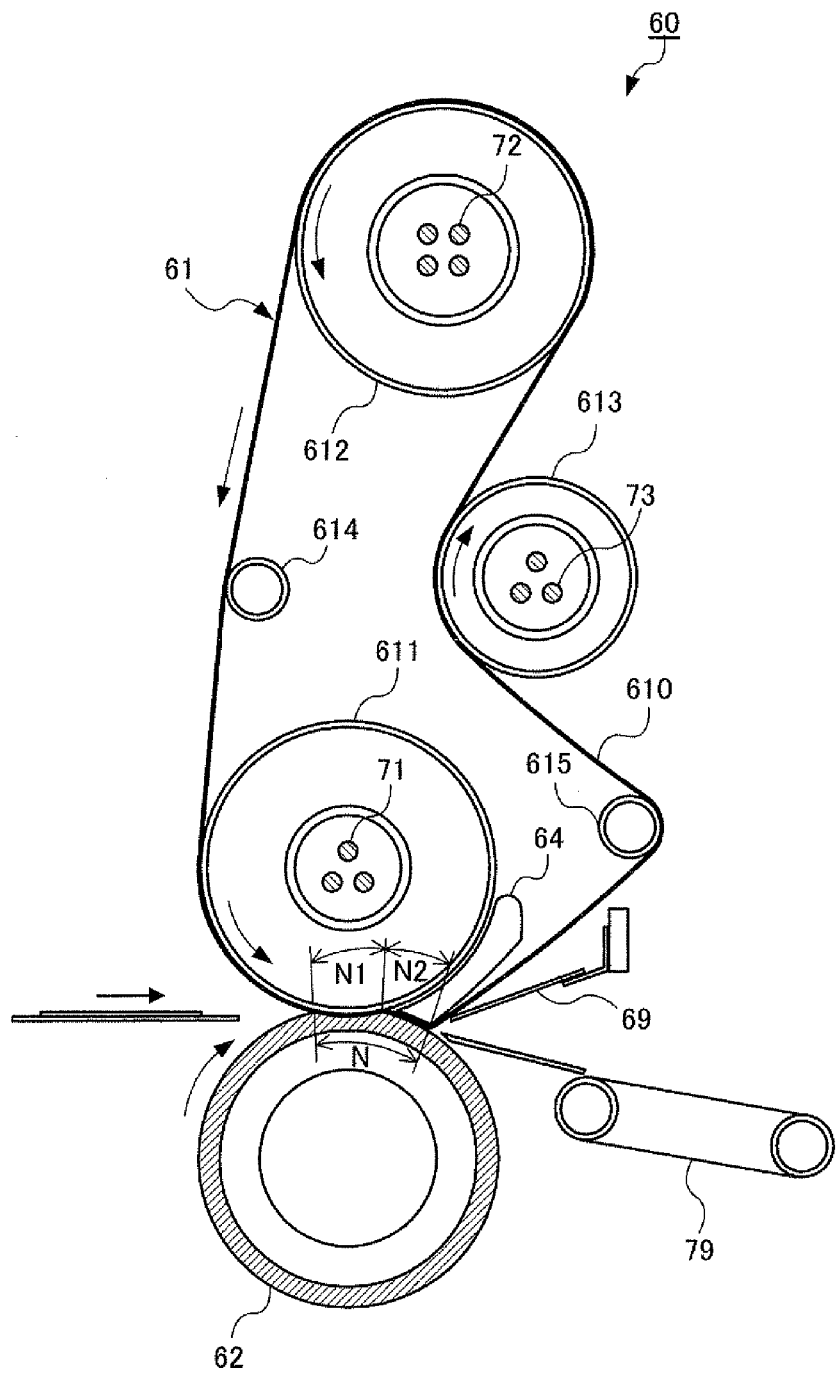
FIG. 2 is a cross-sectional configuration diagram for illustrating a configuration of the fixing unit.

FIG. 2 is a cross-sectional configuration diagram for illustrating a configuration of the fixing unit 60.

The main part of the fixing unit 60 is composed of: a fixing belt module 61 heating a sheet; and a pressure roll 62 configured in such a way that the pressure roll 62 may be contactable with and separable from the fixing belt module 61.

The fixing belt module 61 includes: a fixing belt 610; a fixing roll 611 that rotates while tensioning the fixing belt 610 and heats the fixing belt 610 from the inner side thereof at a nip portion N which is a region where the fixing belt module 61 and the pressure roll 62 are in pressure contact with each other (in contact with each other while pressing each other); an inner heating roll 612 that heats the fixing belt 610 while tensioning the fixing belt 610 from the inner side thereof; and an outer heating roll 613 that heats the fixing belt 610 while tensioning the fixing belt 610 from the outer side thereof. Additionally, the fixing belt module 61 includes: a tension roll 614 that tensions the fixing belt 610 between the fixing roll 611 and the inner heating roll 612 (on the upstream side of the nip portion N in a belt movement direction); a peeling pad 64 that is disposed at a region on the downstream side in the nip portion N and at a position in the vicinity of the fixing roll 611; and a tension roll 615 that tensions the fixing belt 610 on the downstream side of the nip portion N. The fixing roll 611, the inner heating roll 612 and the outer heating roll 613 respectively have a halogen heater 71, a halogen heater 72 and a halogen heater 73 placed inside thereof as heat sources.

<Description of Sheet Transporting System in Image Forming Apparatus>

As a sheet transporting system, the image forming portion 10 additionally includes: plural (two in the present exemplary embodiment) sheet containers 40A and 40B that house sheets therein; feed rolls 41A and 41B that feed and transport sheets housed in the sheet containers 40A and 40B; a first transport path R1 that is used for transporting a sheet fed from the sheet container 40A; and a second transport path R2 that is used for transporting a sheet fed from the sheet container 40B. The image forming portion 10 further includes a third transport path R3 that is used for transporting the sheet fed from the sheet container 40A or 40B toward the secondary transfer region Tr. Additionally, the image forming portion 10 includes: a fourth transport path R4 that is used for transporting the sheet, on which the color toner images are transferred in the secondary transfer region Tr, so as to cause the sheet to pass through the fixing unit 60, the cooling unit 80, the curl correcting unit 85 and the image scanner 100; and a fifth transport path R5 that is used for transporting the sheet from the image scanner 100 toward a sheet stacking portion 44 provided for an output portion of the image forming apparatus 1.

Transfer rolls or transfer belts are arranged on each of the first to fifth transport paths R1 to R5 to sequentially transport sheets fed on the corresponding path.

<Description of Duplex Transporting System>

As a duplex transporting system, the image forming portion 10 additionally includes: an intermediate sheet container 42 that once holds a sheet on a first surface of which the color toner images are, fixed by the fixing unit 60; a sixth transport path R6 that is used for transporting a sheet from the image scanner 100 toward the intermediate sheet container 42; and a seventh transport path R7 that is used for transporting a sheet housed in the intermediate sheet container 42 toward the above-mentioned third transport path R3. The image forming portion 10 further includes: a routing mechanism 43 that is disposed on the downstream side of the image scanner 100 in a sheet transport direction, and selects the route of a sheet between the fifth transport path R5 used for transporting the sheet toward the sheet stacking portion 44 and the sixth transport path R6 used for transporting the sheet toward the intermediate sheet container 42; feed rolls 45 that feed a sheet housed in the intermediate sheet container 42 to transport the sheet toward the seventh transport path R7.

<Description of Image Forming Operation>

Next, a basic image forming operation performed by the image forming apparatus 1 according to the present exemplary embodiment is described by using FIGS. 1 and 2.

The image forming units 11 of the image forming portion 10 form toner images of the respective colors of C, M, HC, HM, Y and K with an electrophotographic process using the above-described functional members. The color toner images formed by the respective image forming units 11 are primarily transferred onto the intermediate transfer belt 20 sequentially by the respective primary transfer rolls 21, so that a combined toner image in which the color toners are superimposed is formed. With the movement of the intermediate transfer belt 20 (in its arrow direction), the combined toner image on the intermediate transfer belt 20 is transported to the secondary transfer region Tr in which the secondary transfer roll 22 is disposed.

Meanwhile, in the sheet transporting system, the feed rolls 41A and 41B rotate in accordance with the start timing of the image formation performed by the image forming units 11. Thereby, one of sheets in the sheet container 40A or 40B selected through the UI portion 90, for example, is fed by the corresponding feed roll 41A or 41B. The sheet fed by the feed roll 41A or 41B is transported to the secondary transfer region Tr along the first transport path R1 or the second transport path R2, and the third transport path R3.

In the secondary transfer region Tr, the combined toner image held on the intermediate transfer belt 20 is secondarily transferred onto the sheet collectively with a transfer electric field formed by the secondary transfer roll 22.

After that, the sheet onto which the combined toner image is transferred is separated from the intermediate transfer belt 20, and is then transported toward the nip portion N of the fixing unit 60 along the fourth transport path R4. The unfixed toner image on the surface of the sheet passing through the nip portion N is fixed on the sheet by pressure and heat acting mainly on a roll nip portion N1.

To be more specific, in the fixing unit 60 of the present exemplary embodiment, the heat to act on the roll nip portion N1 is supplied mainly through the fixing belt 610. The fixing belt 610 is heated by: heat supplied through the fixing roll 611 by the halogen heater 71 disposed inside of the fixing roll 611; heat supplied through the inner heating roll 612 by the halogen heater 72 disposed inside of the inner heating roll 612; and heat supplied through the outer heating roll 613 by the halogen heater 73 disposed inside of the outer heating roll 613. This configuration allows thermal energy to be supplied not only through the fixing roll 611 but also through the inner heating roll 612 and the outer heating roll 613. Accordingly, a sufficient amount of heat supply is secured in the roll nip portion N1 even at a high process speed.

After passing through the roll nip portion N1, the sheet is transported to a peeling pad nip portion N2. The peeling pad nip portion N2 has such a configuration that the peeling pad 64 is pressed against the pressure roll 62 and that the fixing belt 610 is in pressure contact with the pressure roll 62. Accordingly, the peeling pad nip portion N2 has a shape curving upward due to the curvature of the pressure roll 62, whereas the roll nip portion N1 has a shape curving downward due to the curvature of the fixing roll 611.

Accordingly, the sheet heated and pressurized with the curvature of the fixing roll 611 in the roll nip portion N1 changes its traveling direction in the peeling pad nip portion N2 according to the curvature of the pressure roll 62, which is curved in an opposite direction. In this direction change, an extremely little slippage occurs between the toner image on the sheet and the surface of the fixing belt 610. Thereby, adhesion between the toner image and the fixing belt 610 weakens, which facilitates the sheet to be peeled off the fixing belt 610. Hence, the peeling pad nip portion N2 may be regarded as a preparation step for secure peeling in a final peeling step.

Then, since the fixing belt 610 is transported so as to wind around the peeling pad 64 at an exit of the peeling pad nip portion N2, the transport direction of the fixing belt 610 drastically changes at this exit. To be more specific, since the fixing belt 610 moves along the outer surface of the peeling pad 64, the fixing belt 610 is caused to form a large curve. For this reason, the sheet whose adhesion to the fixing belt 610 is weakened in the peeling pad nip portion N2 is separated from the fixing belt 610 by the resiliency of the sheet itself.

Then, the traveling direction of the sheet separated from the fixing belt 610 is guided by a peeling guide plate 69 disposed on the downstream side of the peeling pad nip portion N2. The sheet guided by the peeling guide plate 69 is thereafter transported toward the cooling unit 80 by an exit belt 79, and is cooled by the cooling unit 80. A curl of the sheet is then corrected by the curl correction unit 85, and the image recorded on the sheet is scanned by the image scanner 100. After that, in a simplex printing mode, the sheet having passed through the image scanner 100 is guided by the switching mechanism 43 to the fifth transport path R5, and is transported toward the sheet stacking portion 44.

The cleaners 16 remove toner attached to the photoconductive drums 12 after the primary transfer (residual toner after the primary transfer), and a belt cleaner 26 removes toner attached to the intermediate transfer belt 20 after the secondary transfer (residual toner after the secondary transfer).

In a duplex printing mode, on the other hand, after the sheet having the first surface on which the image is fixed by the above-described process passes through the image scanner 100, the sheet is guided by the switching mechanism 43 to the sixth transport path R6 and transported in the sixth transport path R6 to the intermediate sheet container 42. Then, in accordance with the timing at which the image forming units 11 start image formation on a second surface of the sheet, the feed rolls 45 rotate again and feed the sheet from the intermediate sheet container 42. The sheet picked up by the feed rolls 45 is transported along the seventh transport path R7 and the third transport path R3, and reaches the secondary transfer region Tr.

In the secondary transfer region Tr, as in the case of the first surface, the color toner images for the second surface held on the intermediate transfer belt 20 are secondarily transferred onto the sheet collectively with the transfer electric field formed by the secondary transfer roll 22.

Then, as in the case of the first surface, the sheet having the toner images transferred onto both surfaces thereof undergoes fixing at the fixing unit 60, and is cooled by the cooling unit 80. A curl of the sheet is then corrected by the curl correction unit 85, and the image recorded on the sheet is scanned by the image scanner 100. After that, the sheet having passed through the image scanner 100 is guided by the switching mechanism 43 to the fifth transport path R5, and is transported toward the sheet stacking portion 44.

In a manner described above, the image formation process of the image forming apparatus 1 is repeated in cycles for the number of prints to be produced.

<Description of Image Scanner>

Figure 3:
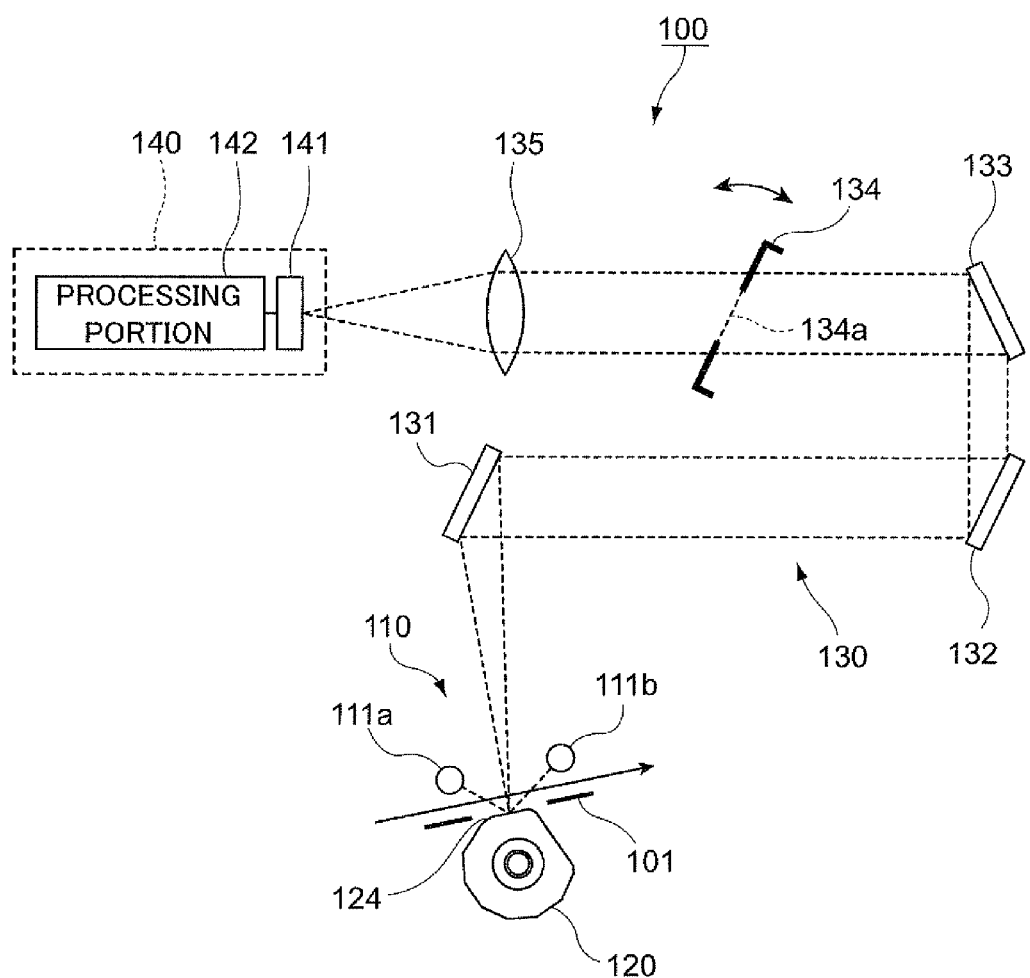
FIG. 3 is a diagram illustrating the image scanner of the exemplary embodiment.

FIG. 3 is a diagram illustrating the image scanner 100 of the present exemplary embodiment.

The image scanner 100 of the present exemplary embodiment is an example of a scanner unit that scans an image on a sheet on which a toner image is fixed by the fixing unit 60. The image scanner 100 includes: a light source 110 that irradiates, with light, a sheet on which an image is formed; a scanning accuracy measuring unit 120 as an example of a reflecting portion that has various measurement surfaces in order to adjust the image scanner 100; an optical system 130 that guides light reflected by the sheet or the scanning accuracy measuring unit 120; and a charge coupled device (CCD) sensor 140 that converts the light guided by the optical system 130 into light amount data.

In the present exemplary embodiment, the light source 110 is formed of a pair of straight tubes of xenon fluorescent lamps 111a and 111b. The light source 110 irradiates, with light, a sheet that passes on a transporting surface while guided by a guide surface 101, to generate reflected light as information on an image formed on the sheet.

In the present exemplary embodiment, forming the light source 110 by use of a pair of the xenon fluorescent lamps 111a and 111b makes illumination intensity of light with which the sheet is irradiated hardly change even when the sheet is transported obliquely with respect to the transporting surface. Specifically, if only one of the xenon fluorescent lamps is provided, then the illumination intensity of light with which the sheet is irradiated easily changes when the sheet is inclined. In this case, an image might not be normally scanned.

Figure 4:
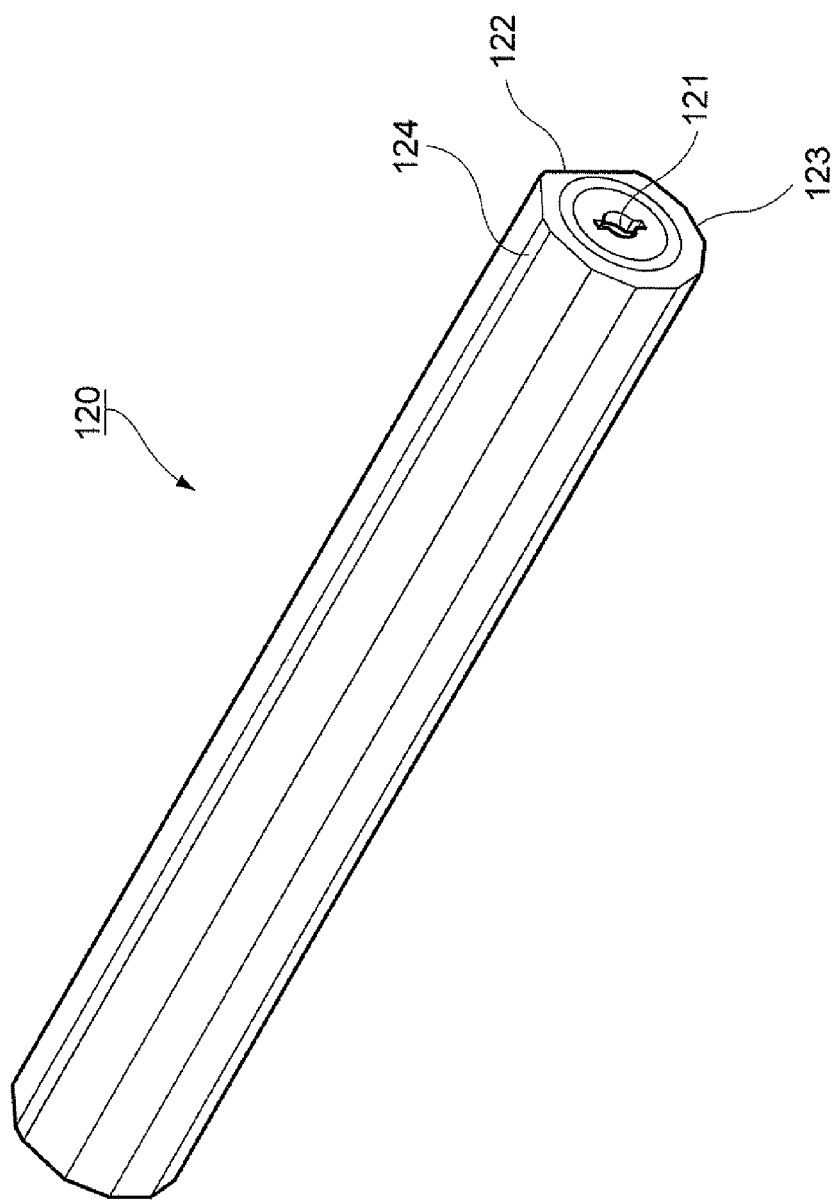
FIG. 4 is a diagram illustrating the scanning accuracy measuring unit.

FIG. 4 is a diagram illustrating the scanning accuracy measuring unit 120.

The scanning accuracy measuring unit 120 of the present exemplary embodiment is a roll of a dodecagonal prism having twelve surfaces on a side portion thereof. These surfaces serve as various measurement surfaces for adjusting the image scanner 100. The scanning accuracy measuring unit 120 is made of aluminum, for example, and has the twelve surfaces processed by cutting. From the viewpoint of suppressing errors in measurement, the scanning accuracy measuring unit 120 is made by anodizing the surfaces thereof in black and by sticking a chart for measurement on a predetermined surface thereof by use of a double-sided tape or the like. The scanning accuracy measuring unit 120 has an axis portion 121 to which a stepping motor (not shown) and a speed reduction gear (not shown) are connected, and is rotatable around the axis portion 121. This configuration allows the measurement surfaces required for adjusting the image scanner 100 to face to the transporting surface of sheets.

The measurement surfaces includes a surface provided with a white reference plate to perform color calibration of white, and a surface provided with various color patterns to perform color calibration of scanned data. Additionally, in the present exemplary embodiment, one of the measurement surfaces 123 is provided with a measurement chart for specular reflection light that is an example of a reflecting surface for measuring the amount of specular reflection light coming from the light source 110. Details of the chart will be described later.

In the present exemplary embodiment, the scanning accuracy measuring unit 120 is provided with a retraction surface 122 and a sheet holding surface 124 in addition to the measurement surfaces.

The retraction surface 122 is a surface used for avoiding interference between the scanning accuracy measuring unit 120 and a sheet. As will be described later in detail, it is when calibration of the image scanner 100 or the image forming units 11 is performed on the occasion of turning-on or the like of the power of the image forming apparatus 1, for example, that the image scanner 100 operates in the present exemplary embodiment. Thus, on the occasion of usual image formation, the image scanner 100 does not operate and a sheet only passes through the image scanner 100. For this reason, on the occasion of usual image formation, it is desirable that the scanning accuracy measuring unit 120 retract to a position where the scanning accuracy measuring unit 120 does not come into contact with a sheet. The retraction surface 122 is a surface having wider space as compared with the other measurement surfaces, and may be made by being subjected to more cutting than the other surfaces at the time when the twelve surfaces on the side portion of the scanning accuracy measuring unit 120 are made. The retraction surface 122 is placed below the transporting surface of sheets when the scanning accuracy measuring unit 120 is rotated to turn this retraction surface 122 to the transporting surface of sheets, which results in non-interference between the sheet and the retraction surface 122. By this configuration, the scanning accuracy measuring unit 120 is capable of retracting to a position where the scanning accuracy measuring unit 120 does not come into contact with a sheet, on the occasion of usual image formation.

The sheet holding surface 124 is a surface to be turned to the transporting surface of sheets when calibration of the image forming units 11 is performed. The sheet holding surface 124 is formed so as to be placed slightly above the transporting surface of sheets at the time when the sheet holding surface 124 is turned to the transporting surface of sheets. When a sheet passes through the image scanner 100, the sheet holding surface 124 guides the sheet together with the guide surface 101 and thereby allows the sheet to pass through so that the sheet may fit a predetermined transporting surface more. Accordingly, unevenness of scanning may be reduced more when an image on a sheet is scanned.

Returning to FIG. 3, the optical system 130 is formed of mirrors 131, 132 and 133, a diaphragm 134 and a lens 135. Light reflected on a sheet or each measurement surface of the scanning accuracy measuring unit 120 is reflected by the mirrors 131, 132 and 133, and is then reduced by the diaphragm 134 so as to have a predetermined light amount. The diaphragm 134 has a window portion 134a at a center portion thereof, and is rotatable around the window portion 134a in the direction of an arrow. Thus, by rotating the diaphragm 134, the amount of light passing through the window portion 134a may be changed and reduced to the predetermined light amount. The light is then linearly condensed by the lens 135 and forms an image on the CCD sensor 140. The line to which the light is condensed extends in the direction perpendicular to the paper of FIG. 3, for example.

The CCD sensor 140 includes CCDs 141 arranged in lines, as an example of a light receiving portion that receives light reflected by a sheet. In the present exemplary embodiment, the CCDs 141 corresponding to colors of R (red), G (green) and B (blue) are arranged in three lines, and make it possible to measure an image recorded on a sheet, by means of the colors of RGB. That is, the CCD sensor 140 is a three-line color CCD. Light received by the CCDs 141 is photoelectrically converted to an electric charge. This electric charge is transferred to a processing portion 142.

The processing portion 142 detects the electric charge transferred from the CCDs 141 to generate an electric signal. This electric signal will be light amount data that is information for adjusting the image forming units 11. Specifically, the processing portion 142 generates information for adjusting an image to be formed on a sheet and, information for measuring the amount of specular reflection light, by use of light received by the CCDs 141. The information corresponds to the light amount data.

<Description of Measurement Surface 123>

Next, a more detailed description is given of the measurement surface 123 of the scanning accuracy measuring unit 120 which surface is provided with a measurement chart for specular reflection light 125.

Figure 5:
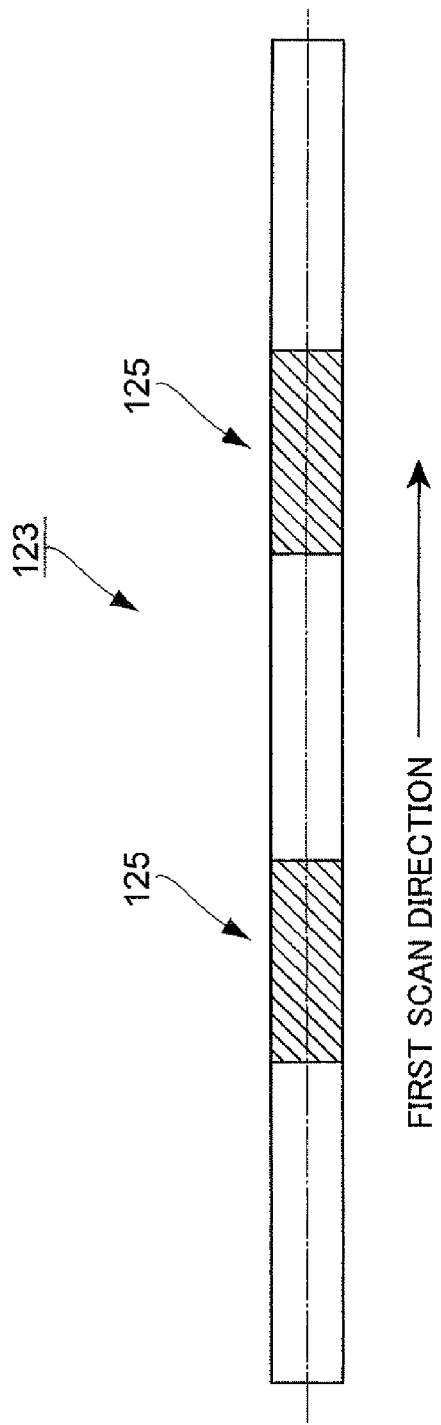
FIG. 5 is a diagram illustrating the measurement surface provided with the measurement charts for specular reflection light.

FIG. 5 is a diagram illustrating the measurement surface 123 provided with the measurement chart for specular reflection light 125.

On the measurement surface 123 shown in FIG. 5, the measurement chart for specular reflection light 125 is provided at two positions in the longitudinal direction of the measurement surface 123.

Figure 6:
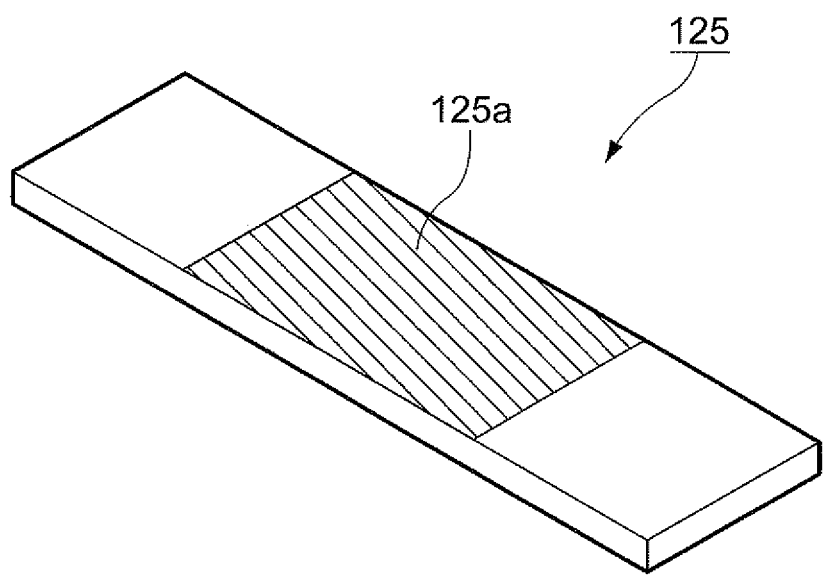
FIG. 6 is a perspective view illustrating a first example of the measurement chart for specular reflection light.

FIG. 6 is a perspective view illustrating a first example of the measurement chart for specular reflection light 125.

As shown in FIG. 6, the measurement chart for specular reflection light 125 includes a measurement surface for specular reflection light 125a that is an example of a reflecting surface for measuring the amount of specular reflection light coming from the light source 110, the specular reflection light being included in the light received by the CCDs 141. In the present exemplary embodiment, the measurement surface for specular reflection light 125a is an absorption surface for diffused light, and may be a black surface.

Using such a measurement surface for specular reflection light 125a allows the amount of the specular reflection light of the light source 110 to be measured. Specifically, when a sheet having an image formed thereon is irradiated with light from the light source 110, the light is divided into specular reflection light reflected on the surface of the sheet and diffused light that is emitted outward after entering into the sheet. The specular reflection light is light having substantially the same spectrum distribution as the light source 110, and has white color when the xenon fluorescent lamps 111a and 111b are used as the light source 110. In contrast, the diffused light is light having information on the image on the sheet, and includes information on color and density of a part irradiated with the light form the light source 110.

In a case where the measurement surface for specular reflection light 125a is irradiated with light from the light source 110, if the measurement surface for specular reflection light 125a is a black surface, diffused light is absorbed to have the intensity thereof weakened when entering into the measurement surface for specular reflection light 125a, which leads to almost no emission. On the other hand, specular reflection light has strong intensity, and most of the light reaching the CCDs 141 is specular reflection light. Accordingly, the light amount data generated by the CCD sensor 140 may be regarded as the intensity of the specular reflection light without any modification. That is, using the measurement surface for specular reflection light 125a of the present exemplary embodiment allows the amount of the specular reflection light of the light source 110 to be measured.

If the amount of the specular reflection light thus measured is beyond a predetermined range, the image scanner 100 may not scan an image normally in some cases. Specifically, since the specular reflection light is light including no information on an image recorded on a sheet, if the specular reflection light whose amount is beyond the predetermined range reaches the CCDs 141, original color and density of the image may not be read. Thus, measuring the amount of the specular reflection light makes it possible to confirm whether or not the image scanner 100 is able to be scanning an image normally.

The measurement surface for specular reflection light 125a is not limited to a black surface. However, if the measurement surface for specular reflection light 125a has color other than black, diffused light is also emitted from the measurement surface for specular reflection light 125a. Thus, it is necessary to obtain in advance the amount of diffused light entering the CCDs 141. On the other hand, if the measurement surface for specular reflection light 125a has black color, since most of the light entering the CCDs 141 is specular reflection light as described above, it is more advantageous in that the light amount data generated by the CCD sensor 140 may be used without any modification. Additionally, measurement errors become smaller in this case.

In the present exemplary embodiment, the measurement surface for specular reflection light 125a is provided at two positions in the longitudinal direction of the measurement surface 123, as described above. Thus, the amount of the specular reflection light may be measured at each of the positions. Accordingly, even when the amount of the specular reflection light is beyond a predetermined range at a portion in the longitudinal direction of the measurement surface 123, this may be detected.

Figure 7:
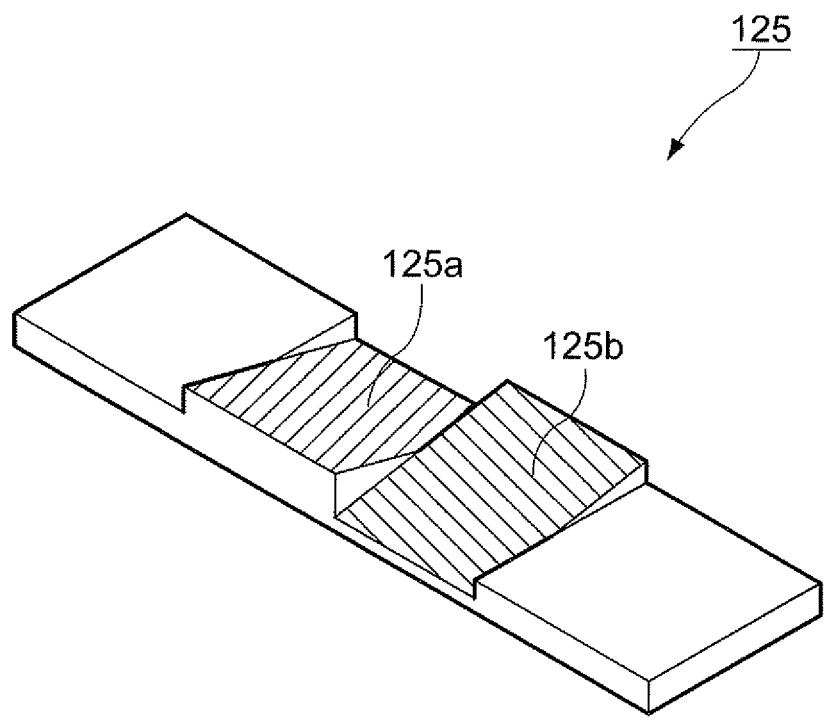
FIG. 7 is a perspective view illustrating a second example of the measurement chart for specular reflection light.

FIG. 7 is a perspective view illustrating a second example of the measurement chart for specular reflection light 125.

The measurement chart for specular reflection light 125 shown in FIG. 7 includes measurement surfaces for specular reflection light 125a and 125b. The measurement surfaces for specular reflection light 125a and 125b are disposed with an inclination to a predetermined surface. In the present exemplary embodiment, the predetermined surface is the transporting surface of sheets. The measurement surface for specular reflection light 125a is disposed so as to incline with a predetermined angle toward the direction of the xenon fluorescent lamp 111a of the light source 110, while the measurement surface for specular reflection light 125b is disposed so as to incline with a predetermined angle toward the direction of the xenon fluorescent lamp 111b of the light source 110. This angle is 6 degrees, for example. The measurement surfaces for specular reflection light 125a and 125b are surfaces colored with black having uniform density, for example.

Using such measurement surfaces for specular reflection light 125a and 125b allows the amount of the specular reflection light to be measured, for a case where a sheet is transported with an inclination to the predetermined transporting surface.

Specifically, in the present exemplary embodiment, when a sheet passes through the image scanner 100, the sheet is guided on the guide surface 101 as described above. However, since the transport path for sheet passage has an allowance, the sheet does not necessarily pass precisely on the predetermined transporting surface. For this reason, when a sheet passes therethrough, the sheet may be transported with an inclination. In the present exemplary embodiment, this inclination angle in the direction of the xenon fluorescent lamps 111a and 111b is within ±6 degrees with respect to the predetermined transporting surface. Thus, the measurement surfaces for specular reflection light 125a and 125b are inclined by 6 degrees in the direction of the xenon fluorescent lamps 111a and 111b, respectively, as described above. This makes it possible to confirm whether the amount of the specular reflection light reflected by a sheet is within a predetermined range, even when the sheet is transported with an inclination.

<Description of Adjustment of Image Forming Units 11>

Next, a description is given of a procedure to adjust the image forming units 11 by using the image scanner 100.

Figure 8:
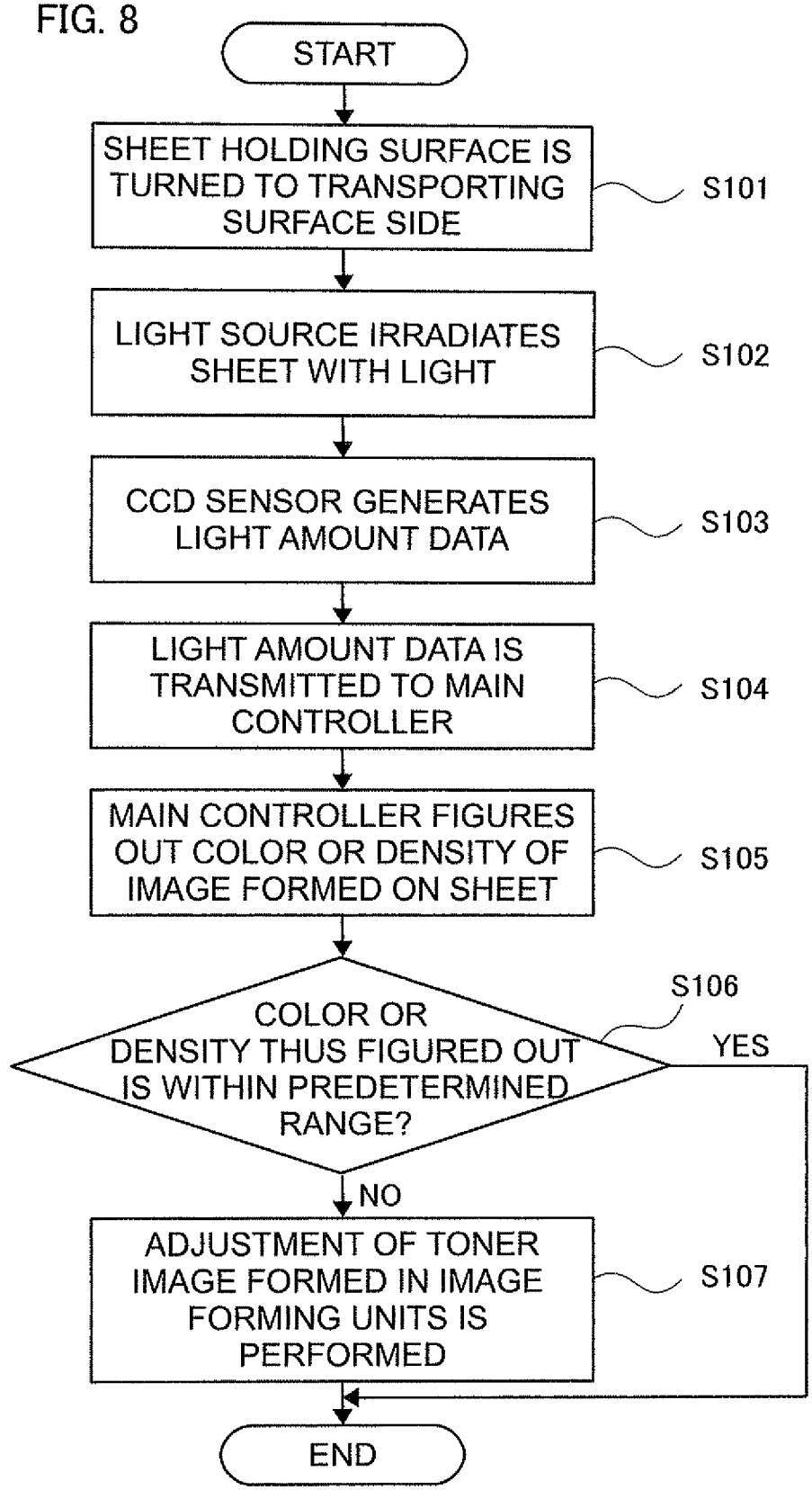
FIG. 8 is a flowchart illustrating a procedure to adjust the image forming units.

FIG. 8 is a flowchart illustrating a procedure to adjust the image forming units 11.

First, if the measurement surface and the retraction surface 122 of the scanning accuracy measuring unit 120 are on the transporting surface side, the scanning accuracy measuring unit 120 is turned to face the sheet holding surface 124 to the transporting surface side (Step 101). When a sheet having an image formed thereon is transported, the light source 110 irradiates the sheet with light (Step 102). This image is usually a test pattern in which a predetermined pattern is recorded. Light reflected by the sheet is guided by the optical system 130, and then the CCD sensor 140 receives this reflected light to generate light amount data (Step 103). This light amount data is transmitted to the main controller 50 of the image forming apparatus 1 (Step 104). The main controller 50 then figures out color or density of the image formed on the sheet from the light amount data (Step 105). The main controller 50 further determines whether the color or density thus figured out is within a predetermined range by referring to a predetermined threshold value (Step 106). If the color or density is not within the predetermined range, adjustment of a toner image to be formed in the image forming units 11 is performed (Step 107). Meanwhile, if the color or density is within the predetermined range, the adjustment is finished.

This series of operations is performed on the occasion of calibration of the image forming units 11. That is, adjusting the image forming units 11 in advance on the occasion of turning-on or the like of the power of the image forming apparatus 1 allows formation of an image having less unevenness in regard to color or density thereof. Note that calibration may be performed not only on the image forming units 11, but also on the other portions, such as the transfer unit.

<Description of Measurement of Amount of Specular reflection Light from Light Source 110>

Next, a description is given of a procedure to measure the amount of the specular reflection light by using the measurement surface 123 provided with the measurement chart for specular reflection light 125.

FIG. 9 is a flowchart illustrating a procedure to measure the amount of the specular reflection light from the light source 110.

First, the measurement surface 123 of the scanning accuracy measuring unit 120 is turned to the transporting surface side (Step 201). The light source 110 then irradiates the measurement surface 123 with light (Step 202). Specular reflection light reflected by the measurement chart for specular reflection light 125 provided for the measurement surface 123 is guided by the optical system 130, and then the CCD sensor 140 receives this specular reflection light to generate light amount data (Step 203). This light amount data is transmitted to the main controller 50 of the image forming apparatus 1 (Step 204). The main controller 50 then calculates reflectance and the like of the measurement surfaces for specular reflection light 125a and 125b from the light amount data (Step 205). The main controller 50 then determines whether or not the value thus calculated is within a predetermined range (for example, whether reflectance of the measurement surfaces for specular reflection light 125a and 125b is within ±2%) by referring to a predetermined threshold value (Step 206). If the reflectance or the like does not come within this range, the main controller 50 decides that the amount of the specular reflection light is out of a specified value. The main controller 50 then outputs a warning that is a prompt to perform maintenance of the image scanner 100 (Step 207). Meanwhile, if the reflectance or the like is within this range, the procedure goes to the processing to scan an image of a sheet having been described with FIG. 8.

This series of operations is performed on the occasion of calibration of the image scanner 100. That is, adjusting the image scanner 100 in advance prior to performing the above-described calibration of the image forming units 11 by using the image scanner 100 allows accuracy of the calibration of the image forming units 11 to be improved.

Note that the processing performed by the main controller 50 in the above description may be performed in the image scanner 100. That is, a computing portion or the like for performing this processing may be alternately provided in the image scanner 100, and caused to perform processing similar to that of the main controller 50.

The description has been given assuming that the image scanner 100 described above in detail is a device for adjusting the image forming units 11 of the image forming apparatus 1, but the image scanner 100 is not limited thereto. For example, the image scanner 100 may be applied to a scanning apparatus, such as a typical scanner that irradiates a sheet placed on a platen glass with light by using a light source and that scans reflected light by means of a CCD sensor or the like, the sheet having an image of a document or the like formed thereon.

Additionally, the description has been given assuming that the image scanner 100 described above in detail is applied to the image forming apparatus forming an image by formation of a toner image, but the image scanner 100 is not limited thereto. For example, the image scanner 100 may be applied to an image forming apparatus that forms an image by an ink-jet system.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image scanner comprising:
a first light source and a second light source that irradiate, with lights, a recording medium on which an image is formed at a first inclination angle and a second inclination angle respectively;
a light receiving portion that receives light reflected by the recording medium; and
a reflecting portion that has a surface for measuring the amount of specular reflection light coming from the light source, the specular reflection light being included in the light received by the light receiving portion,
wherein the reflecting portion includes at least two measurement surfaces provided in a longitudinal direction of the reflecting portion and one of the two measurement surfaces includes a measurement chart for measuring the amount of specular reflection light, the measurement chart including at least one reflecting surface;
wherein the at least two measurement surfaces are disposed at the first inclination angle and the second inclination angle in directions of the first light source and the second light source.

2. The image scanner according to claim 1, wherein the reflecting surface disposed in the reflecting portion is an absorption surface for diffused light.

3. The image scanner according to claim 1, wherein the reflecting surface disposed in the reflecting portion is a plurality of reflecting surfaces, and at least one of the reflecting surfaces is disposed with an inclination to a predetermined surface.

4. The image scanner according to claim 2, wherein the reflecting surface disposed in the reflecting portion is a plurality of reflecting surfaces, and at least one of the reflecting surfaces is disposed with an inclination to a predetermined surface.

5. The image scanner according to claim 1, further comprising a processing portion generating information for adjusting an image to be formed on the recording medium and information for measuring the amount of the specular reflection light, by use of the light received by the light receiving portion.

6. The image scanner according to claim 2, further comprising a processing portion generating information for adjusting an image to be formed on the recording medium and information for measuring the amount of the specular reflection light, by use of the light received by the light receiving portion.

7. The image scanner according to claim 3, further comprising a processing portion generating information for adjusting an image to be formed on the recording medium and information for measuring the amount of the specular reflection light, by use of the light received by the light receiving portion.

8. The image scanner according to claim 4, further comprising a processing portion generating information for adjusting an image to be formed on the recording medium and information for measuring the amount of the specular reflection light, by use of the light received by the light receiving portion.

9. The image scanner according to claim 1, wherein the reflecting portion retracts to a position where the reflecting portion does not come into contact with the recording medium, when the recording medium is irradiated with the light from the light source.

10. The image scanner according to claim 2, wherein the reflecting portion retracts to a position where the reflecting portion does not come into contact with the recording medium, when the recording medium is irradiated with the light from the light source.

11. The image scanner according to claim 3, wherein the reflecting portion retracts to a position where the reflecting portion does not come into contact with the recording medium, when the recording medium is irradiated with the light from the light source.

12. The image scanner according to claim 4, wherein the reflecting portion retracts to a position where the reflecting portion does not come into contact with the recording medium, when the recording medium is irradiated with the light from the light source.

13. The image scanner according to claim 5, wherein the reflecting portion retracts to a position where the reflecting portion does not come into contact with the recording medium, when the recording medium is irradiated with the light from the light source.

14. The image scanner according to claim 6, wherein the reflecting portion retracts to a position where the reflecting portion does not come into contact with the recording medium, when the recording medium is irradiated with the light from the light source.

15. The image scanner according to claim 7, wherein the reflecting portion retracts to a position where the reflecting portion does not come into contact with the recording medium, when the recording medium is irradiated with the light from the light source.

16. The image scanner according to claim 8, wherein the reflecting portion retracts to a position where the reflecting portion does not come into contact with the recording medium, when the recording medium is irradiated with the light from the light source.

17. An image forming apparatus comprising:
    an image forming portion that forms an image on a recording medium; and
    a scanner unit that scans the image on the recording medium in order to adjust an image to be formed on the recording medium by the image forming portion, wherein the scanner unit includes:
    a first light source and a second light source that irradiate, with lights, the recording medium on which an image is formed at a first inclination angle and a second inclination angle respectively;
    a light receiving portion receiving light reflected by the recording medium; and
    a reflecting portion having a surface for measuring the amount of specular reflection light included in the light received by the light receiving portion,
    wherein the reflecting portion includes at least two measurement surfaces provided in a longitudinal direction of the reflecting portion and one of the two measurement surfaces includes a measurement chart for measuring the amount of specular reflection light, the measurement chart including at least one reflecting surface;
    wherein the at least two measurement surfaces are disposed at the first inclination angle and the second inclination angle in directions of the first light source and the second light source.

18. The image forming apparatus according to claim 17, wherein the image forming portion includes:
    a toner image forming unit that forms a toner image;
    a transfer unit that transfers, onto the recording medium, the toner image formed by the toner image forming unit; and
    a fixing unit that fixes, on the recording medium, the toner image transferred by the transfer unit.

19. The image forming apparatus according to claim 17, wherein the reflecting surface disposed in the reflecting portion is an absorption surface for diffused light.

20. The image forming apparatus according to claim 18, wherein the reflecting surface disposed in the reflecting portion is an absorption surface for diffused light.

* * * * *